Oct. 25, 1955

K. WAGNER 2,721,770

THRUST BEARING FOR CROSSED LEVERS

Filed May 12, 1953

Inventor:
KURT WAGNER
BY *Hans G. Joseph*
HIS AGENT

United States Patent Office 2,721,770
Patented Oct. 25, 1955

2,721,770

THRUST BEARING FOR CROSSED LEVERS

Kurt Wagner, Ebingen, Wurttemberg, Germany, assignor to August Sauter K. G., Ebingen, Germany Application May 12, 1953, Serial No. 354,543

Claims priority, application Germany May 20, 1952

4 Claims. (Cl. 308—2)

The invention concerns a thrust bearing for crossed levers, especially for balance structures, which is distinguished by its small constructional height and great stability.

According to the invention the bearing is characterised in that the knife-edges of the levers which cross one another rest in pans, the carriers of which are supported on one another by means of stilts which can move freely in all directions.

Figure 1:
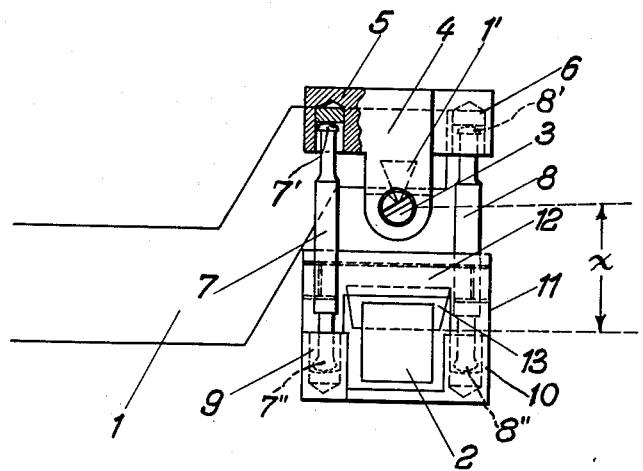
Figure 2:
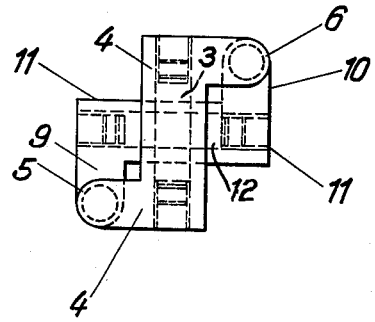

The drawing shows one embodiment of the invention by way of example, and in fact Fig. 1 is a side elevation, partly in section, of the thrust bearing in accordance with the invention, and Fig. 2 is a plan of the bearing.

1 and/or 2 are the two mutually crossed levers, which are connected in compression with one another so as to be capable of transmitting force by means of the thrust bearing according to the invention.

The lever 1 is supported with its knife edge 1' in a pan 3. This pan is arranged in a first stirrup shaped part or carrier 4 having projections 5 and 6 at opposite ends thereof projecting in different directions preferably including right angles with the direction of the carrier 4. Stilts 7 and 8 are journalled in these lateral projections 5 or 6 respectively of the first stirrup shaped pan carrier 4, preferably by means of truncated points (not shown), bulbous surfaces 7', 8', or any other bearing surfaces.

The stilts 7 and 8 are supported by means of second bulbous surfaces 7", 8" thereof on corresponding lateral projections 9 and 10 of a second stirrup shaped pan carrier 11, which extends at right angles to the first pan carrier 4 and contains the second pan 12, on which the knife edge 13 of the lever 2 is supported.

The operation of this device is as follows:

The levers 1 and 2 are displaceable with respect to each other in a substantially vertical direction under the action of a force applied to the thrust bearing, so that the pans 3 and 12 and the carriers 4 and 11 assume different positions also depending on the force applied to the thrust bearing.

Since the two pan carriers 4 and 11 may slide freely in all directions relative to one another as a result of the stilt support, the thrust bearing thus possesses a considerable stability, and indeed especially in the case where the length of the stilts 7 and 8 is greater than the distance $x$ between the bases of the pans 3, 12, because the stilts project with their ends 7', 8' and 7", 8" above the pan base of the pan 3 and below the base of the pan 12.

I claim:

1. A thrust bearing structure forming part of a balance structure or the like, comprising, in combination, a first lever having a knife edge, a first pan supporting said knife edge of said first lever, a first carrier supporting said first pan, a second lever arranged below and at an angle with respect to said first lever so as to cross the same, said second lever having a knife edge, a second pan supporting said knife edge of said second lever, a second carrier arranged below, and extending at an angle with respect to said first carrier, said second carrier containing said second pan, and a pair of stilts having end surfaces engaging, respectively, said carriers, said stilts being arranged at different sides of each of said carriers, and having a length exceeding the distance between the bases of said pans, said stilts projecting with the ends thereof above and below the bases of said pans.

2. A thrust bearing as claimed in claim 1, and lateral projections forming part of said carriers, said stilts being journalled in said lateral projections of said carriers.

3. A thrust bearing as claimed in claim 2, said lateral projections being arranged at opposite ends of said carriers and projecting in different directions therefrom.

4. A thrust bearing as claimed in claim 3, said directions including right angles, respectively, with said carriers.

References Cited in the file of this patent

UNITED STATES PATENTS

| | | |
|---|---|---|
| 516,958 | Austin | Mar. 20, 1894 |
| 998,066 | Zimmerman | July 18, 1911 |
| 2,657,921 | MacBride | Nov. 3, 1953 |